(12) United States Patent
Lin et al.

(10) Patent No.: US 10,951,843 B2
(45) Date of Patent: Mar. 16, 2021

(54) ADJUSTING CONFIDENCE VALUES FOR CORRECTING PIXEL DEFECTS

(71) Applicant: Apple Inc., Cupertino, CA (US)

(72) Inventors: Sheng Lin, San Jose, CA (US); David R. Pope, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/733,949

(22) Filed: Jan. 3, 2020

(65) Prior Publication Data

US 2020/0145594 A1    May 7, 2020

Related U.S. Application Data

(63) Continuation of application No. 16/101,154, filed on Aug. 10, 2018, now Pat. No. 10,554,914.

(51) Int. Cl.
*H04N 5/367* (2011.01)
*H04N 1/60* (2006.01)
*H04N 9/64* (2006.01)
*G06T 5/20* (2006.01)

(52) U.S. Cl.
CPC ............ *H04N 5/367* (2013.01); *G06T 5/20* (2013.01); *H04N 1/6019* (2013.01); *H04N 9/646* (2013.01)

(58) Field of Classification Search
CPC . G06T 2207/10024; G06T 2207/30168; G06T 5/20; G06T 7/0004; H04N 1/409; H04N 1/4097; H04N 1/58; H04N 1/6019; H04N 5/367; H04N 5/3675; H04N 9/646
See application file for complete search history.

(56) References Cited

U.S. PATENT DOCUMENTS

| | | | |
|---|---|---|---|
| 7,283,164 B2 | 10/2007 | Kakarala et al. | |
| 8,009,208 B2* | 8/2011 | Steinberg | H04N 5/2171 348/241 |
| 8,619,082 B1* | 12/2013 | Ciurea | G02B 27/0075 345/427 |
| 2006/0181700 A1* | 8/2006 | Andrews | G01N 21/474 356/237.2 |
| 2008/0218610 A1* | 9/2008 | Chapman | H04N 17/002 348/246 |

(Continued)

FOREIGN PATENT DOCUMENTS

WO    WO 2011/049777 A1    4/2011

*Primary Examiner* — Amy R Hsu
(74) *Attorney, Agent, or Firm* — Fenwick & West LLP

(57) ABSTRACT

Embodiments relate to a pixel defect detection circuit for detecting and correcting defective pixels in captured image frames. The pixel defect detection circuit includes a defect pixel location table that maps pixel locations in an image frame to respective confidence values, each confidence value indicating a likelihood that a corresponding pixel is defective. The pixel defect detection circuit further includes a dynamic defect processing circuit configured to determine whether a first pixel of an image frame is defective, and a flatness detection circuit configured to determine whether the first pixel is in a flat region of the image frame. The confidence value corresponding to the location of the first pixel is updated based upon whether the first pixel is determined be defective if the first pixel is determined to be in a flat region, and not updated if the first pixel is determined to not be in a flat region.

20 Claims, 8 Drawing Sheets

(56) References Cited

U.S. PATENT DOCUMENTS

| | | | |
|---|---|---|---|
| 2010/0141798 A1* | 6/2010 | Steinberg | H04N 5/2171 |
| | | | 348/234 |
| 2010/0321537 A1* | 12/2010 | Zamfir | G06T 5/005 |
| | | | 348/241 |
| 2011/0057802 A1* | 3/2011 | Topfer | H04N 5/367 |
| | | | 340/584 |
| 2013/0208995 A1* | 8/2013 | Zamfir | H04N 5/2171 |
| | | | 382/275 |
| 2014/0211048 A1* | 7/2014 | Kolli | H04N 5/3675 |
| | | | 348/246 |
| 2015/0264285 A1* | 9/2015 | Tatsuzawa | H04N 5/367 |
| | | | 348/246 |
| 2017/0070692 A1* | 3/2017 | Lin | H04N 5/2176 |
| 2017/0277979 A1 | 9/2017 | Allen et al. | |
| 2019/0096057 A1* | 3/2019 | Allen | G06T 7/0008 |

\* cited by examiner

ADJUSTING CONFIDENCE VALUES FOR CORRECTING PIXEL DEFECTS

CROSS-REFERENCE TO RELATED APPLICATIONS

This application is a continuation of U.S. application Ser. No. 16/101,154, filed Aug. 10, 2018, which is incorporated herein by reference in its entirety.

BACKGROUND

1. Field of the Disclosure

The present disclosure relates a circuit for processing images and more specifically to correcting defective pixels in received images.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

SUMMARY

Embodiments relate to a pixel defect detection circuit for detecting and correcting defective pixels in captured image frames. The pixel defect detection circuit includes a defect pixel location table that maps pixel locations in an image frame to respective confidence values, each confidence value indicating a likelihood that a corresponding pixel is defective. The pixel defect detection circuit further includes a dynamic defect processing circuit configured to apply a dynamic defect detection technique to a first pixel of an image frame to determine whether the first pixel is defective, and a flatness detection circuit configured to determine whether the first pixel is in a flat region of the image frame. A confidence adjustment circuit is configured to update the confidence value associated with the first pixel in defect pixel location table based upon the determinations of the dynamic defect processing circuit and the flatness detection circuit. For example, if the flatness detection circuit determines that the first pixel is in a flat region, confidence adjustment circuit updates a confidence value for a location corresponding to the first pixel in the defect pixel location table. In addition, the dynamic defect processing circuit may apply a defective pixel correction technique to the first pixel to update the value of the first pixel, responsive to the updated confidence value at or above a defect correction threshold. On the other hand, if it is determined the first pixel is not in a flat region, the confidence value is not updated.

Figure 1:
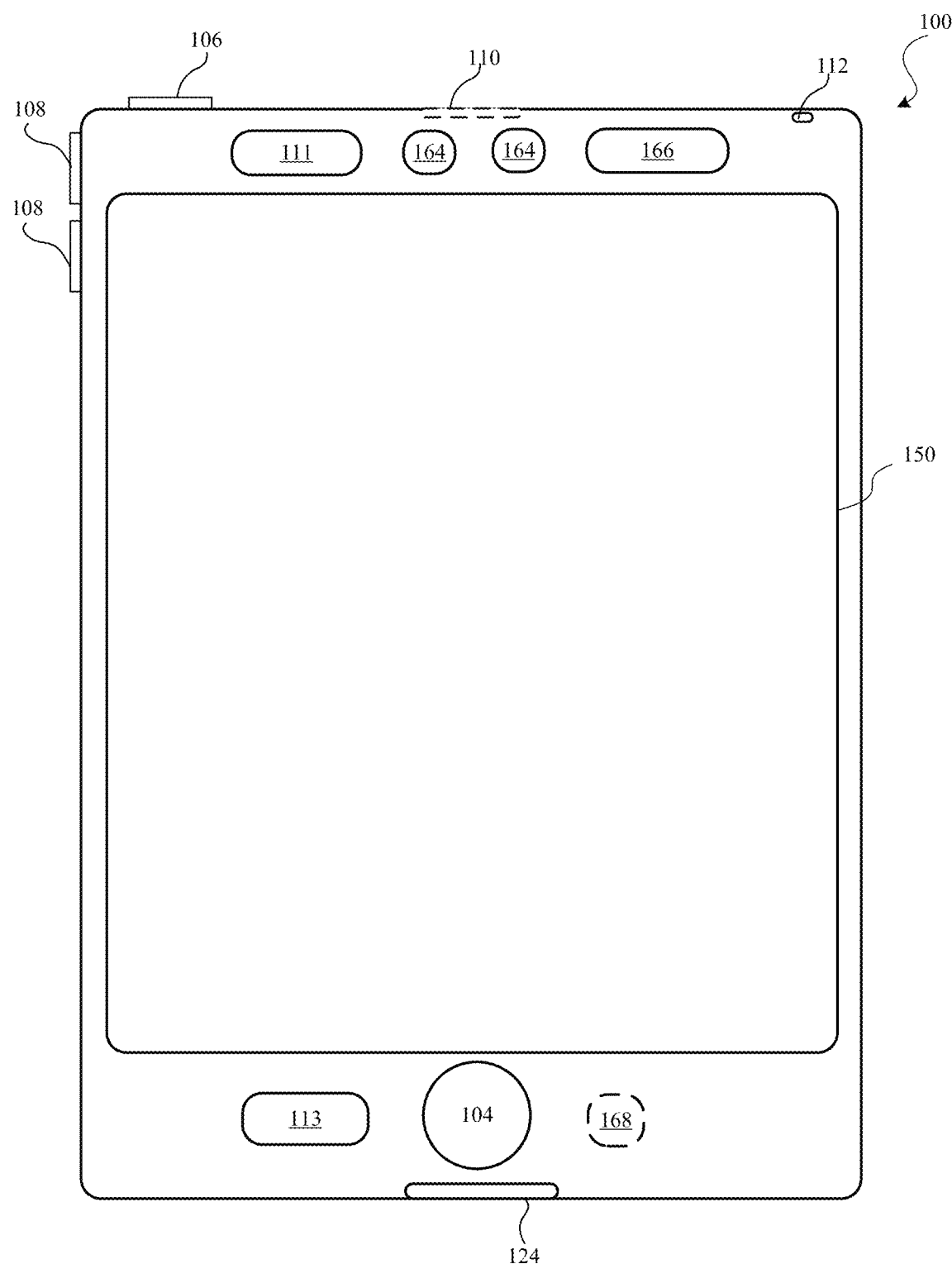
FIG. 1 is a high-level diagram of an electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to an image signal processor that detects and corrects defective pixels in received image data. When performing dynamic defect pixel correction, a confidence value for a particular pixel may be adjusted to indicate a level of confidence that the pixel is actually defective. The confidence value may be updated only if the pixel is determined to be in a flat region of the captured image, where flatness is determined based upon a range of pixel values of nearby pixels. Because the pixel values within flat regions of an image are more predictable in comparison to more variable regions of the image, dynamic defect pixel correction may be considered more reliable in these regions and less likely to produce false positives. Therefore, by only updating the confidence value for pixels within flat regions, the stored confidence values may be more reliable and less prone to influence by erroneous dynamic defect pixel correction results. As used herein, a "flat region" refers to a region of a captured image (e.g., a continuous array of pixels in the captured image) where the variation of pixel values in at least one color channel does not exceed a threshold value. For example, a region of a captured image may be considered to be flat if the pixel values within the region do not deviate from an average pixel value of the area by more than a threshold amount.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
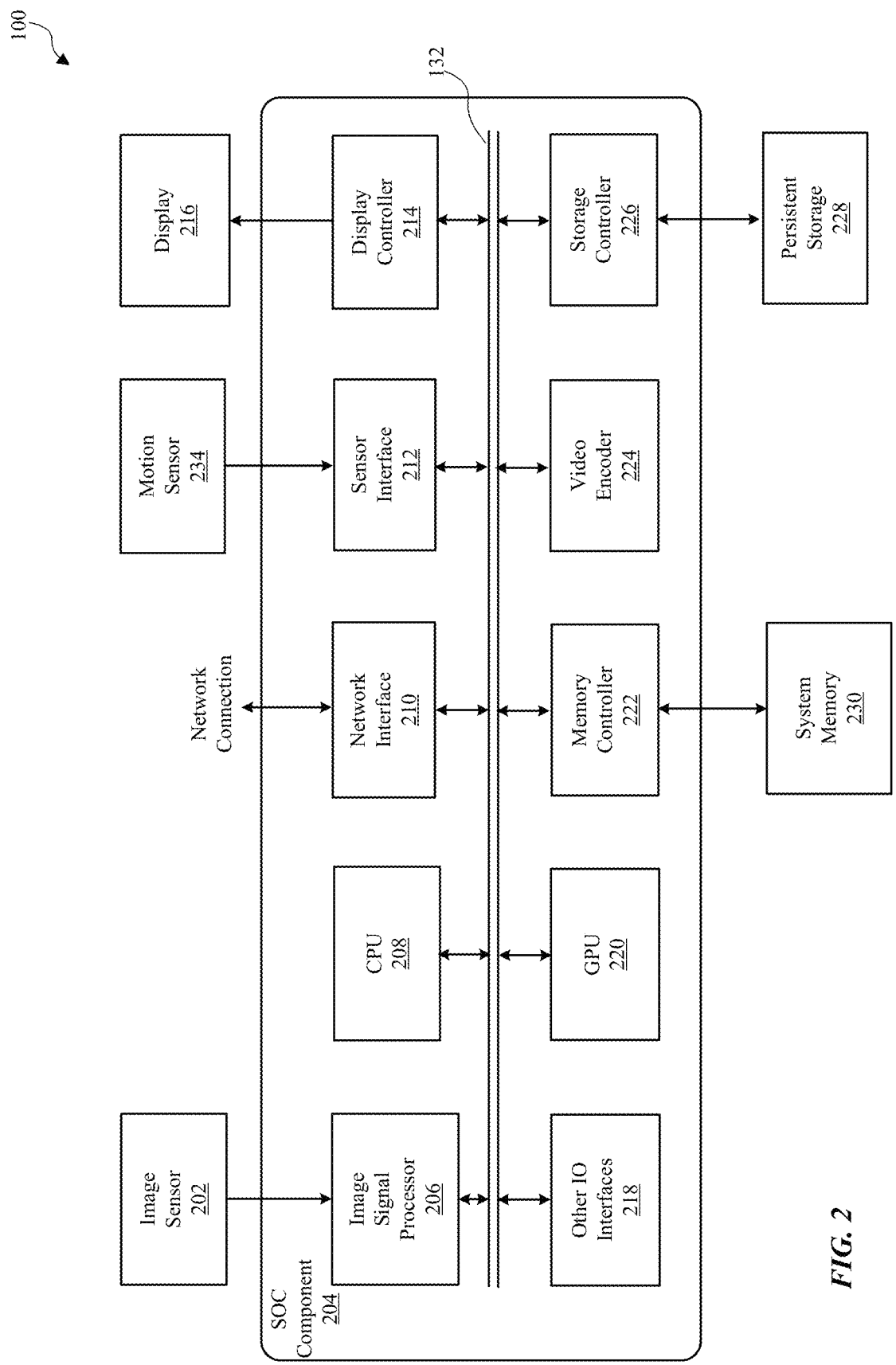
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
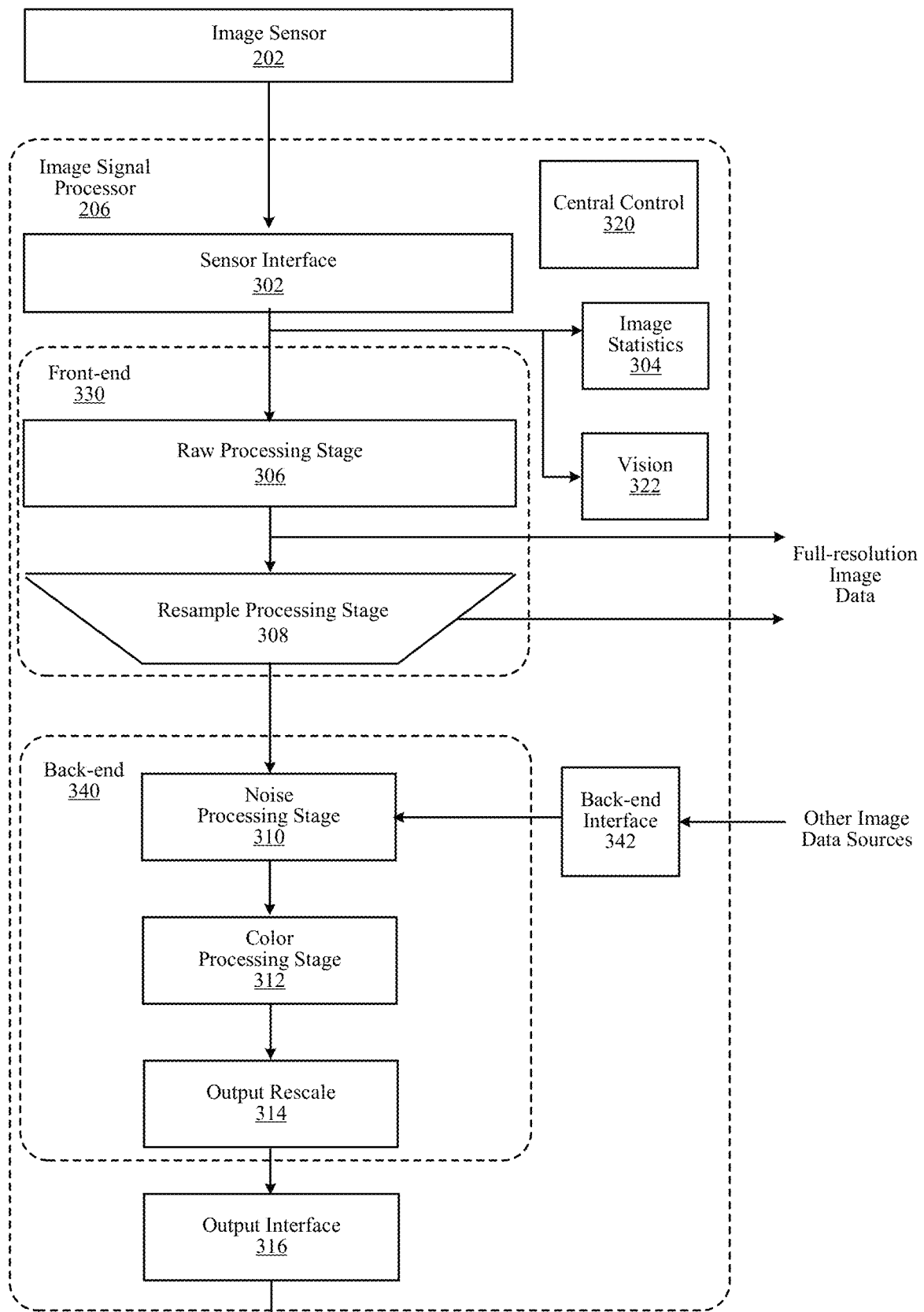
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 102 to receive raw image data. ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Additional examples of image signal processors are described in United States Patent Publication No. 2017/0070692, titled "Correcting Pixel Defects Based on Defect History in an Image Processing Pipeline," filed on Sep. 4, 2015.

Defect Pixel Correction

Figure 4:
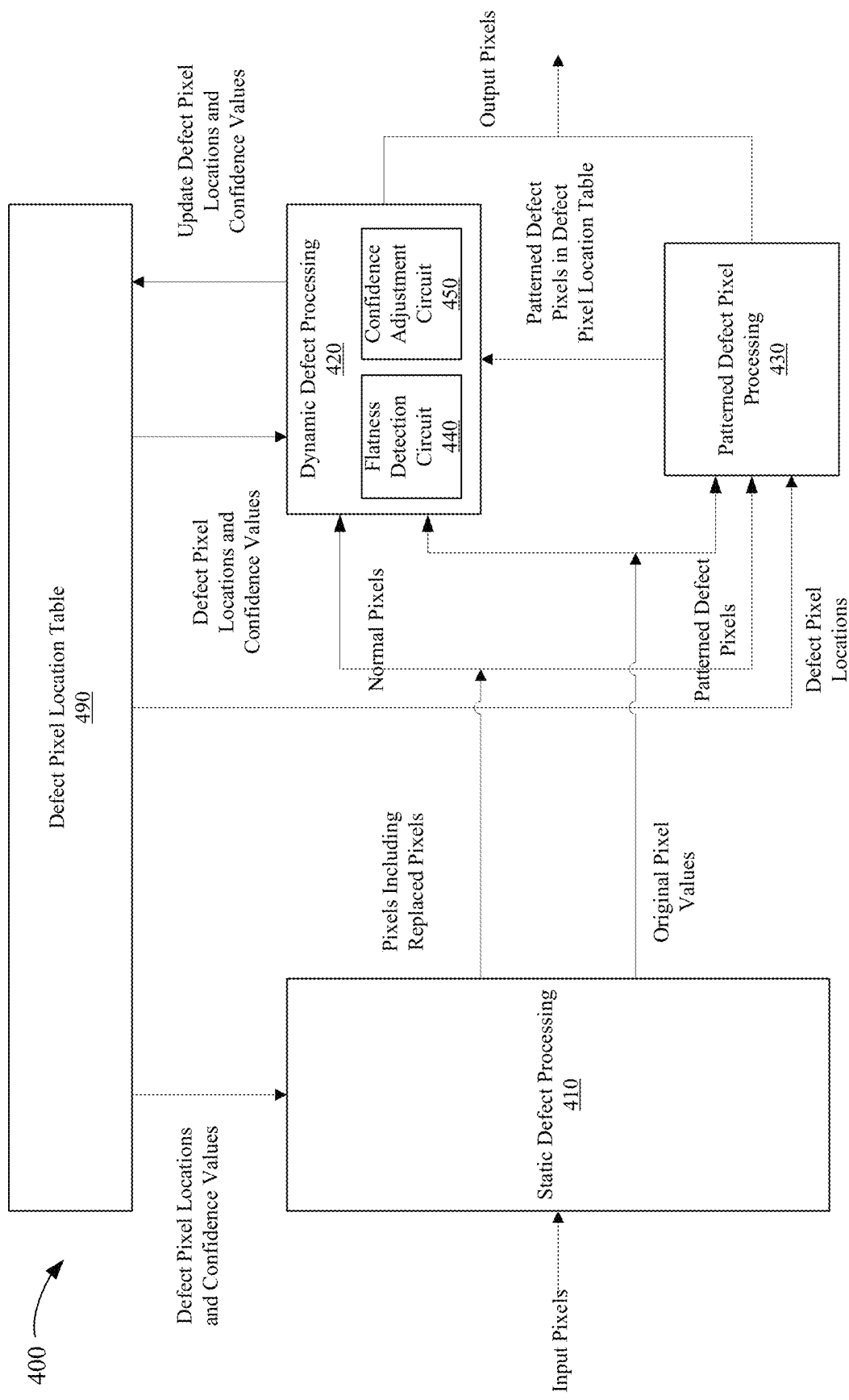
FIG. 4 is a logical block diagram illustrating components and operations of a pixel defect correction component of an image signal processor, according to some embodiments.

FIG. 4 is a logical block diagram illustrating components and operations of a pixel defect correction circuit 400 of an image signal processor 106, according to some embodiments. Pixel defect correction circuit 400 may, for example, be implemented at a raw processing stage 306 of an image signal processor 106 as illustrated in FIG. 3.

In some embodiments, the pixel defect correction circuit 400 may include multiple stages or components. For example, as shown in FIG. 4, pixel defect correction circuit 400 may include, but is not limited to, a static defect preprocessing circuit 410, a dynamic defect processing circuit 420, and a patterned defect pixel processing circuit 430. Pixel defect correction circuit 400 may also include or have access to a defect pixel location table 490 that includes the locations and defect confidence values for pixels in image frames captured by image sensor(s) 102. Defect pixel location table 490 may be stored in an external memory (e.g., on the ISP 106) or buffered to a local memory (not shown).

In some embodiments, the pixel defect detection and correction functionality implemented by pixel defect correction circuit 400 may require M horizontal×N vertical (where M and N are integers larger than one, e.g., 7×7) spatial support, as neighborhood pixels may be used in detecting and/or correcting defective pixels. Thus, while not shown in FIG. 4 for simplicity, pixel defect correction circuit 400 may implement M (e.g., 7) line buffers. In some embodiments, the line buffers may be shared by the dynamic defect processing circuit 420 and the patterned defect pixel processing circuit 430, thus saving real estate in the ISP 106.

Pixel defect correction circuit 400 may receive a stream of raw pixel data, for example from a sensor interface 302 as illustrated in FIG. 3. In some embodiments, the raw pixel data may have been preprocessed by the sensor interface 302. For each pixel, a static defect processing circuit 410 of the pixel defect correction circuit 400 may check defect pixel location table 490 to determine if the pixel is marked as defective. If the pixel is marked as defective and its defect confidence value is greater than or equal to a defect replacement confidence threshold, then the value of the pixel may be replaced with the value of a neighbor pixel, for example the value of the previous (left) pixel of the same color component (e.g., Gr, R, B, or Gb) in scan order as the pixels enter the pixel defect correction circuit 400. In some embodiments, if the defective pixel is on the left edge of the frame, it is instead replaced with a pixel value on a previously processed row, for example the value of the pixel of the same color component two rows above, unless the current pixel is also on the top edge of the frame, in which case the pixel value is not replaced. In some embodiments, the original value of the defective pixel may be stored, for example to a FIFO queue, for possible use in downstream components of the pixel defect correction circuit 400 (e.g., the dynamic defect processing circuit 420 and the patterned defect pixel processing circuit 430).

The pixels including the replacement values are output from the static defect processing circuit 410 to downstream components of the pixel defect correction circuit 400. Patterned defect pixels may first go to the patterned defect pixel processing circuit 430. The other (normal) pixels go to the dynamic defect processing circuit 420.

For each patterned defect pixel, the patterned defect pixel processing circuit 430 may check defect pixel location table 490 to determine if the patterned defect pixel is marked as defective in the table 490. If the patterned defect pixel is marked as defective, the pixel may be sent to the dynamic defect processing circuit 420. Otherwise, the pixel value of the patterned defect pixel is corrected using a patterned defect pixel correction technique. For example, in some embodiments of a patterned defect pixel correction technique, the value of the patterned defect pixel is first replaced with a weighted combination of the pixel and its neighbor pixels of the same color component (e.g., Gr or Gb, as patterned defect pixels may all be green pixels). A weighted combination of the pixel and its neighbor pixels of all color components is then applied to the patterned defect pixel with the replaced value to produce the patterned defect pixel correction value. The weights for the weighted combination in both replacement and correction steps may, for example, be computed based on the pixel value and the values of its neighbor pixels. The corrected patterned defect pixel may then be output to a next stage or component of the image processing pipeline, for example in scan order with other corrected pixels and non-defective pixels.

Normal pixels output from the static defect processing circuit 410 go to the dynamic defect processing circuit 420. In addition, patterned defect pixels marked as defective in the defect pixel location table 490 are sent to the dynamic defect processing circuit 420. For each pixel, the dynamic defect processing circuit 420 applies a dynamic defect detection technique to determine if the pixel is defective. In some embodiments, a directional gradient technique using two or more neighbor pixels may be used as the dynamic defect detection technique.

Figure 6A:
FIGS. 6A and 6B illustrate neighbor pixels for a current pixel that may be used in a dynamic defect detection technique, according to one embodiment.
Figure 6B:

FIGS. 6A and 6B illustrate example neighbor pixels for a current pixel P that may be used in a dynamic defect detection technique, according to some embodiments. For example, referring to FIG. 6A, for the current pixel P, its eight immediate neighbors P0-P7 of the same color component in a 3×3 area may be used in the directional gradient technique. At the edge of the frame, pixels of the same color component are mirrored outside of the frame. Note that any of various other methods may be used to dynamically detect defective pixels. Also note that other neighborhoods (e.g., a 5×5 pixel neighborhood) may instead or also be used in some embodiments.

FIG. 6B illustrates neighbor pixels for a current pixel P that may be used in a dynamic defect detection technique, in accordance with some embodiments in which the pixels are arranged as a Bayer pattern. For example, FIG. 6B illustrates a current pixel P33 corresponding to a pixel of the red color channel within a 5×5 pixel neighborhood. Pixels P11, P13, P15, P31, P35, P51, P53, and P55 correspond to neighbor pixels in the red color channel, while pixels P22, P24, P42, and P44 correspond to neighboring blue pixels, and pixels P12, P14, P21, P23, P25, P32, P34, P41, P43, P45, P52, and P54 correspond to neighboring green pixels. Also note that other neighborhood sizes may be used in some embodiments.

After applying the dynamic defect detection technique to the current pixel, the dynamic defect processing circuit 420 may update the defect pixel location table 490. In some embodiments, a defective pixel's location may be recorded in the table 490, if not already in the table 490. In addition, the dynamic defect processing circuit 420 may update a confidence value associated with the pixel's location as recorded in the table 490, using a confidence adjustment circuit 450, based upon whether the pixel was determined to be defective by the dynamic defect detection technique. For example, in some embodiments, if a pixel is detected as defective by the dynamic defect detection technique, the confidence adjustment circuit 450 adjusts the defect confidence value of the pixel by incrementing the defect confidence value in the defect pixel location table 490. Otherwise, if the pixel is detected as not being defective, the confidence adjustment circuit 450 may decrement the confidence value for the pixel. In some embodiments, the defect confidence value for a pixel may be incremented or decremented by 1. However, because some defective pixels may be detected as being defective only sporadically and not every frame, in some embodiments, the defect confidence value for a pixel may be incremented by 2 or more, and decremented by a lesser amount (e.g., 1) to detect sometimes-defective pixels.

In some embodiments, the dynamic defect processing circuit 420 uses the confidence adjustment circuit 450 to adjust the confidence values for the pixel stored in the defect pixel location table only under certain circumstances. For example, the dynamic defect processing circuit 420 may comprise a flatness detection circuit 440 used to determine whether the current pixel is within a flat region. The flatness detection circuit 440 may determine whether the current pixel is in a flat region by measuring a level of flatness of an area surrounding the current pixel in the image (e.g., based upon a plurality of neighbor pixels, such as those illustrated in FIG. 6A or FIG. 6B) and comparing the measured flatness to a threshold value. The confidence adjustment circuit 450 only updates the confidence value of the current pixel is determined to be within a flat region.

In some embodiments, after the dynamic defect processing circuit 420 updates the defect pixel location table 490 for the current pixel, the dynamic defect processing circuit 420 may check the defect confidence value for the pixel in the defect pixel location table 490. If the pixel's defect confidence value is greater than or equal to the defect correction confidence threshold, the pixel may be corrected using a defective pixel correction technique, for example using a weighted combination of two or more neighbor pixels, or using some other pixel correction technique. If the pixel's defect confidence value is less than the defect correction confidence threshold, the pixel's value may be replaced with the original pixel value stored by the static defect processing circuit 410, if necessary. The pixel may then be output to a next stage or component of the image processing pipeline, or to two or more stages or components, for example in scan order with other corrected pixels and non-defective pixels.

In some embodiments, the dynamic defect detection technique may generate confidence values when detecting defective pixels. In some embodiments, a combination of these confidence values and the defect confidence values from the defect pixel location table 490 may be compared to the defect correction confidence threshold to determine which pixels are to be corrected by the defective pixel correction technique.

In some embodiments, at least some of the pixels processed by the pixel defect correction circuit 400 may instead or also be written out to a memory, for example according to DMA technology. For example, the patterned defect pixels may be output to memory via DMA technology. The pixel defect correction circuit 400 may include a defect statistics component or module (not shown) that may receive defect information from the dynamic defect processing 420 stage or component and generate and output (e.g., to a memory via DMA technology) defect statistics for at least some processed image frame(s).

In some embodiments, at least some of the stages or components of the pixel defect correction circuit 400 may be programmatically controlled by external hardware and/or software components of the ISP 106, SOC 104, and/or device in which the ISP 106 is implemented, for example by a central control module 320 of the ISP 106 or an image capture application on the device. For example, one or more of the stages or components of the pixel defect correction circuit (e.g., circuits 410, 420, or 430) may be enabled or disabled via external input. As a non-limiting example, the dynamic defect processing circuit 420 may be controlled by external software and/or hardware to operate only on every Nth frame, or to be disabled during certain image capture conditions. In some embodiments, motion data collected by orientation sensor(s) 134 as illustrated in FIG. 1 may be used to detect when the device is in a fixed position or is moving, and this information may be used by hardware and/or software to disable the defect confidence value increment and/or decrement for at least some frames captured while the device is in a fixed position. This may be done to help prevent the dynamic defect processing circuit 420 from tagging pixels that are capturing local highlights (e.g., bright Christmas lights in a night scene) as defective when the camera is being held still or is mounted and is capturing multiple frames of the same scene. In some embodiments, the central control module 320 of the ISP 106 or some other component of the SOC may monitor and modify the defect pixel location table 490. For example, the central control module 320 or some other component may track defective pixels as detected by the pixel defect correction circuit 400 over longer time frames than are tracked by the pixel defect correction circuit 400, and may mark pixels that are historically determined to be defective as permanently defective (e.g., the pixel is a stuck or dead pixel, or a hot or cold defect pixel). This may be done by setting their defect confidence value in the defect pixel location table 490 to a value that is not dynamically updated by the dynamic defect detection and correction circuit of the pixel defect correction circuit 400. Pixels thus marked may be considered as permanently defective; these pixels may be corrected, but the defect confidence value for these pixels is not dynamically updated.

Flatness Detection

Figure 5:
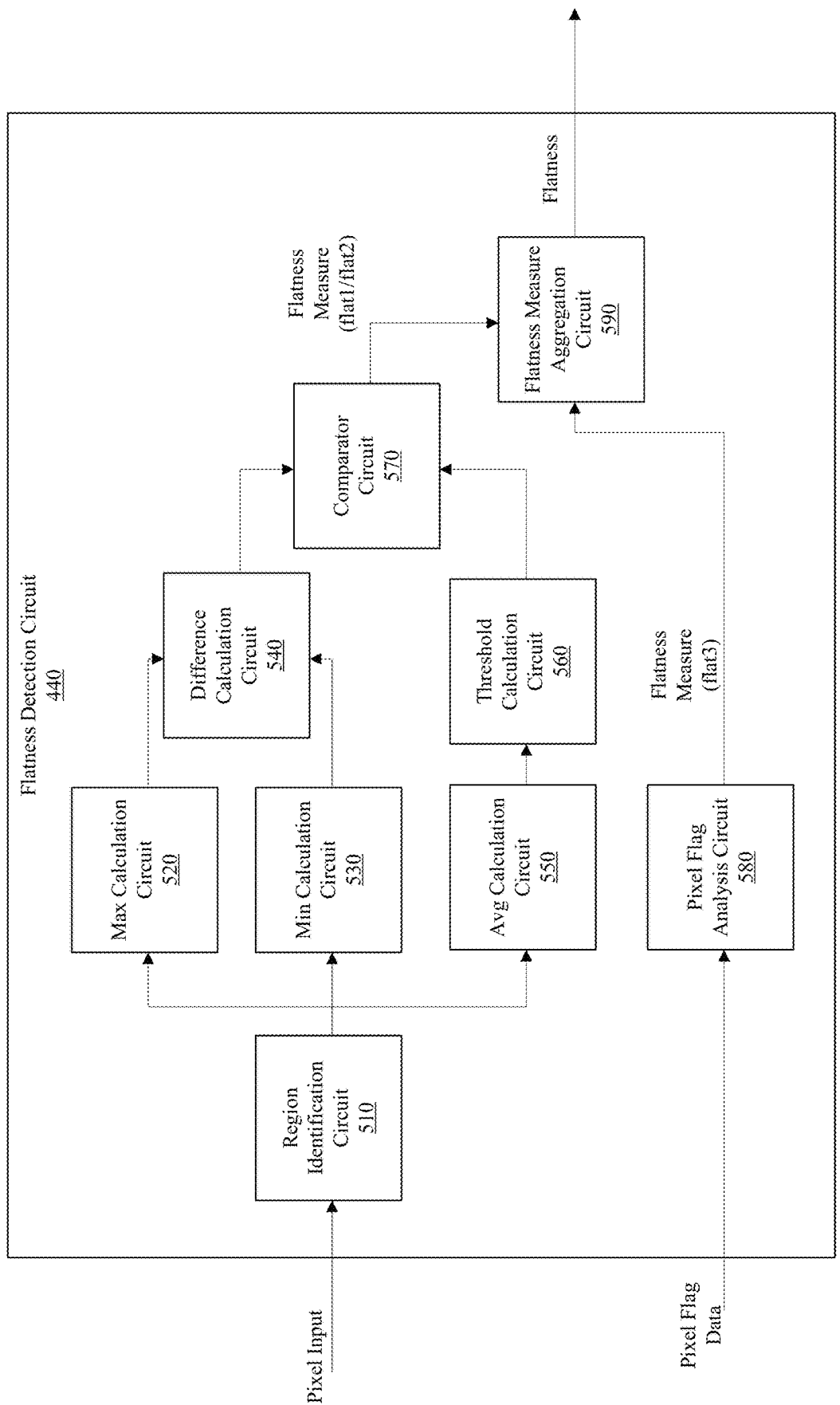
FIG. 5 is a block diagram illustrating a flatness detection circuit, according to one embodiment.

FIG. 5 illustrates a block diagram of the flatness detection circuit 440 of a dynamic defect processing circuit 420, in accordance with some embodiments. As discussed above with reference to FIG. 4, in some embodiments, the dynamic defect processing circuit 420 only updates the confidence value associated with a pixel in the defect pixel location table 490 (e.g., using the confidence adjustment circuit 450), if the flatness detection circuit 440 determines that the pixel is within a flat region on the image. In some embodiments, the flatness detection circuit 440 receives a pixel input corresponding to a particular pixel of a frame of image data, and outputs a flatness indicator indicating whether the pixel is within a flat region of the image. The flatness indicator may be a binary value, where 1 indicates that the pixel is within a flat region, and 0 indicates that the pixel is not in a flat region.

In order to determine whether a pixel is within a flat region, the flatness detection circuit 440 comprises a region identification circuit 510 extracting the values of a plurality of neighbor pixels. The plurality of neighbor pixels may correspond to a square array of pixels surround the current pixel input (e.g., a 3×3 array, a 5×5 array, and/or the like). For example, where the pixels of the image are arranged in a Bayer pattern, the neighbor pixels may correspond to the 5×5 array of pixels corresponding to different colors surrounding the current pixel, as illustrated in FIG. 6B, where the current pixel is P33. If the current pixel is near an edge of the image frame, pixels of the same color component may be mirrored outside of the frame to identify the plurality of neighbor pixels. In some embodiments, the dynamic defect processing circuit 420 analyzes every pixel of a received frame of image data. As each pixel of the frame is subject to flatness detection by the flatness detection circuit 440, the neighbor pixels may appear as a moving window across the image.

Using the color values of the identified neighbor pixels, the flatness detection circuit 440 determines flatness based upon a range of pixel values of the same color component as the current pixel. For example, if the current pixel P33 is red (as illustrated in FIG. 6B), the flatness associated with the current pixel will be determined based upon the values of the identified neighbor pixels that are also red (e.g., pixels P11, P13, P15, P31, P35, P51, P53, and P55).

In some embodiments, the flatness detection circuit 440 determines multiple different flatness measures for a pixel (e.g., three different flatness measures hereinafter referred to as flat1, flat2, and flat3). For example, the different flatness measures associated with the pixel are combined in order to determine whether the pixel should be considered to be in a flat region of the image, which will be discussed in greater detail below.

The flatness detection circuit 440 comprises a maximum (max) calculation circuit 520, a minimum (min) calculation circuit 530, and an average (avg) calculation circuit 550. Each of the max calculation circuit 520, the min calculation circuit 530, and the avg calculation circuit 550 receive values corresponding to at least a portion of the neighbor pixels identified by the region identification circuit 510 (e.g., same color neighbor pixels), and determine a maximum pixel value, a minimum pixel value, and an average pixel value of the same color neighbor pixels, respectively. For example, to calculate the first flatness measure flat1, the max calculation circuit 520, the min calculation circuit 530, and the avg calculation circuit 550 calculate the maximum, minimum, and average values of the neighbor pixels of the same color as the current pixel P33. In some embodiments, these values are calculated as follows:

$$F\max_1 = \max(P11, P13, P15, P31, P35, P51, P53, P55) \quad (1)$$

$$F\min_1 = \min(P11, P13, P15, P31, P35, P51, P53, P55) \quad (2)$$

$$Favg_1 = (P11+P13+P15+P31+P35+P51+P53+P55+4) >> 3 \quad (3)$$

For example, as shown in Equation (3) above, the average of the same color neighbor pixels $Favg_1$ is calculated by the avg calculation circuit 550 as the sum of the eight same color neighbor pixels (which may be adjusted by a constant value, e.g., +4, for rounding purposes) divided by 8 (which may be for simplicity implemented in hardware as a right shift of 3 bits). Because the bit shift will cause any fractional remainder of the division to be dropped, in some embodiments, the sum of the pixel values may be adjusted by a constant value (e.g., +4) to round up certain fractional remainders (e.g., remainder≥0.5).

The calculated minimum and maximum values are used by the flatness detection circuit 440 to determine a flatness metric corresponding to a range of pixel values of the neighbor pixels of the same color. For example, a difference calculation circuit 540 receives the calculated maximum and minimum values from the max calculation circuit 520 and min calculation circuit 530 and determines a difference value corresponding to the flatness metric (e.g., $Fmax_1 - Fmin_1$). In addition, a threshold value is determined by a threshold calculation circuit 560 based upon the calculated average pixel value. In some embodiments, the threshold value may be determined as follows:

$$Thd_1 \propto FlatThd_1[C1] + (FlatThd_2[C1]*\max(0, Favg_1)) \quad (4)$$

where C1 corresponds to the color of the current pixel P33 (e.g., red), and FlatThd1 and FlatThd2 correspond to predetermined flatness threshold values. Each of FlatThd1 and FlatThd2 may have different values based upon the color C1 of the current pixel P33 (e.g., red, green, or blue). As such, as shown in the equation (4), the threshold value may be calculated as a function of the calculated average pixel value $Favg_1$, where a larger value of $Favg_1$ will result in a higher threshold value. In some embodiments, the threshold Thd1 may be expressed as linear function of the average pixel value Favg1. In other embodiments, the threshold Thd1 may be computed as a square root, or another non-linear modification, of a linear function of the average pixel value Favg1.

The first flatness measure flat1 may be determined by using a comparator circuit 570 to compare the flatness metric corresponding to the range of pixel values (e.g., as determined by the difference calculation circuit 540) and the threshold value (e.g., as determined by the threshold calculation circuit 560), as follows:

$$Flat_1 = (F\max_1 - F\min_1) < Thd_1 \quad (5)$$

As such, if the range of pixel values determined by the difference calculation circuit 540 does not exceed the threshold value, then the first flatness measure flat1 for the input pixel is considered to be true (e.g., has a value of 1). Since the flatness threshold Thd1 is based on the average pixel value Favg1, the higher the average pixel value of the identified neighbor pixels, the greater the range of pixel values of the neighbor pixels can be while satisfying the flatness measure flat1.

In some embodiments, the current pixel may be deemed to be part of a flat region of the image based solely on the flatness measure flat1. However, as discussed above, in other embodiments, additional flatness measures (e.g., flat2 and/or flat3) may be calculated and combined with the flatness measure flat1 to determine the flatness of the current pixel.

In some embodiments, a second flatness measure flat2 may be calculated based upon a neighbor pixel of the current pixel. For example, where the current pixel is pixel P33 as illustrated in the Bayer pattern in FIG. 6B, the second flatness measure flat2 may be calculated based on a pixel P23 that is immediately above the current pixel P33. In other embodiments, flat2 may be determined based on a different neighbor pixel. The pixel that the flatness measure flat2 is based off on may be selected to be of a different color from the current pixel (e.g., green instead of red).

Calculating flat2 may be similar to how flat1 is calculated, and may reuse a number of the same circuit components, such as the max calculation circuit 520 to calculate a maximum pixel value of one or more neighbor pixels of the same color as the pixel P23, the min calculation circuit 530 to calculate a minimum pixel value, and the avg calculation circuit 550 to calculate an average pixel value. For example:

$$F\ max_2 = max(P21, P23, P25, P41, P43, P45) \quad (6)$$

$$F\ min_2 = min(P21, P23, P25, P41, P43, P45) \quad (7)$$

$$Favg_2 = (P21 + P23*2 + P25 + P41 + P43*2 + P45 + 4) >> 3 \quad (8)$$

In some embodiments, $Favg_2$ may be calculated based upon a smaller number of neighbor pixels in comparison to $Favg_1$ (e.g., 6 pixels instead of 8 pixels). However, in order to reduce hardware complexity, when calculating $Favg_2$, certain pixel values may be scaled or doubled (e.g., pixels P23 and P43 as shown in equation (8)), so that $Favg_2$ can be calculated using a division of a power of 2 (e.g., division by 8, implemented in hardware as a right shift of 3 bits). In other embodiments, the pixel values are not adjusted and the average is calculated based on division of the sum of pixel values by a number of pixels, even if not a power of two (e.g., division by 6).

Similar to how flat1 is calculated, flat2 may be calculated based on a comparison between a flatness metric correspond to the range of pixel values ($Fmax_2 - Fmin_2$) and a threshold value $Thd_2$ calculated based upon the average pixel value. For example:

$$Thd_2 \propto FlatThd_1[C2] + (FlatThd_2[C2]*max(0, Favg_2)) \quad (9)$$

$$Flat_2 = (F\ max_2 - F\ min_2) < Thd_2 \quad (10)$$

where C2 corresponds to the color of the pixel P23 (e.g., green), and FlatThd1 and FlatThd2 correspond to predetermined flatness threshold values.

In addition, a pixel flag analysis circuit 580 determines a third flatness measure (flat3) based upon whether a neighboring pixel of the current pixel satisfies one or more conditions (e.g., is defective). For example, flat3 for a pixel may indicate whether the pixel is defective (e.g., flat3=0 for a pixel indicates that the pixel is considered defective using dynamic defect detection), and may be determined as follows:

$$Flat_3 = !(flag\_hi | flag\_lo | speckle\_hi | speckle\_lo) \quad (11)$$

where flag_hi and flag_lo indicate whether the value of the pixel exceeds a threshold value above the highest or second highest neighbor pixels or is smaller than a threshold value below lowest or second lowest neighbor pixels, respectively. In addition, in some embodiments, the dynamic defect processing circuit 420 may determine if a pixel corresponds to a speckle in the captured image. A speckle may be defined as a pixel for which the pixel value is some amount (e.g., a speckle threshold) over (or under) the values (e.g., the average values) of its neighbor pixels of the same color component. For example, speckle_hi corresponds to if the pixel value is at least the speckle threshold over the average value of the neighbor pixels, and speckle_lo corresponds to if the pixel value is at least the speckle threshold below the average value of the neighbor pixels. These determined pixel flags are received by the pixel flag analysis circuit 580 to determine the value of flat3, which is satisfied if the pixel value of the current pixel is not too high or low and is not a speckle location. Because these pixel flags may be indicative of whether the pixel is defective as determined by the dynamic defect processing circuit 420, the value of flat3 is indicative of whether the pixel is defective (e.g., flat3=0 indicating that the pixel is defective, and flat3=1 indicating that the pixel is not defective).

The various flatness measures (e.g., flat1, flat2, flat3) are combined or aggregated by a flatness measure aggregation circuit 590 to determine whether the current pixel is within a flat region. In some embodiments, the flatness detection circuit 440 runs at 2ppc (pixels per clock), and processes a pair of pixels in a single clock cycle. For example, each clock cycle, the PDC may process an even/odd pair of pixels (e.g., P32 and P33) to determine first, second, and third flatness measures (flat1, flat2, and flat3) for each pixel of the pair. In a Bayer pattern, each pair will contain one green pixel (P32) and a red or blue pixel (P33). In some embodiments, the final flatness for each pixel as determined by the flatness measure aggregation circuit 590 will be based upon its own flatness measures (flat1, flat2, flat3) as well as the flatness measures of its neighboring paired pixel.

For example, in some embodiments, an aggregation NumFlat for each pixel of the pair is calculated, corresponding to an aggregation of certain flatness measures of the pixel and of its neighboring paired pixel.

$$NumFlat(P32) = Flat2(P32) + Flat2(P33) + Flat1(P33) + Flat3(P33) \quad (12)$$

$$NumFlat(P33) = Flat2(P33) + Flat2(P32) + Flat1(P32) + Flat3(P32) \quad (13)$$

As such, the NumFlat values for each pixel P32 or P33 indicates a number of different flatness measures for the pixel and its neighboring paired pixel that are true. The overall flatness indicator for the pixels can then be calculated as follows:

$$Flat(P32) = Flat1(P32) \&\& (NumFlat(P32) \geq NumFlat\text{-}Thd) \quad (14)$$

$$Flat(P33) = Flat1(P33) \&\& (NumFlat(P33) \geq NumFlat\text{-}Thd) \quad (15)$$

where NumFlatThd corresponds to a predetermined value. For example, NumFlatThd may be represented as an unsigned 3-bit value having a value between 0 and 4. As such, using the calculations described above, a pixel P33 is considered to be in a flat region if both its flat1 flatness measure is satisfied, and if the number of other satisfied flatness measures (as indicated by NumFlat) exceeds or equals a threshold value.

How the flatness determination circuit 440 determines whether a pixel is part of a flat region may be accomplished in other ways. For example, in some embodiments, the flatness determination may be based only on flat1 for the pixel, or on flat1 for the pixel and its neighboring paired pixel.

The determined flatness of the pixel is used to determine whether or not the confidence value for the pixel recorded in the defect pixel location table 490 is updated following dynamic defect detection by the dynamic defect processing circuit 420. For example, if the pixel is determined to not be in a flat region, then the confidence value for the pixel remains unchanged, regardless of the result of the dynamic pixel defect detection. If the pixel is determined to be defective, the dynamic defect processing circuit 420 may correct the value of the pixel (e.g., based upon one or more of its neighbor pixels), but does not use the confidence adjustment circuit 450 to update the confidence value of the pixel stored in the defect pixel location table 490.

While the above formulas refer primarily to pixels of an image arranged in a Bayer pattern (e.g., as illustrated in FIG. 6B), in some embodiments, flatness may be determined for pixels of a monochrome image (e.g., as illustrated in FIG. 6A). In some embodiments, flatness for a monochrome image may be determined based upon flat1, flat2, and flat3 flatness measures as described above. In other embodiments, for monochrome images, the flatness measure flat1 may be determined based upon all neighborhood pixels instead of only the subset indicated in equations (1) through (5), since the pixels are not associated with different color channels. For example, referring to FIG. 6A, the neighbor pixels P0 through P7 of the current pixel P may be used to calculate a minimum, maximum, and average pixel value for determining a flatness measure for the current pixel P. When a 5×5 array of pixels neighboring the current pixel is considered (e.g., as illustrated in FIG. 6B), the flatness measure flat1 may be calculated based upon the 24 surrounding pixels (e.g., based upon the max, min, and avg of the 24 pixels). In some embodiments, when determining flatness for a pixel P of a monochrome image using all neighboring pixels of a surrounding array, only the first flatness measure flat1 may be determined.

Process Flow

Figure 7:
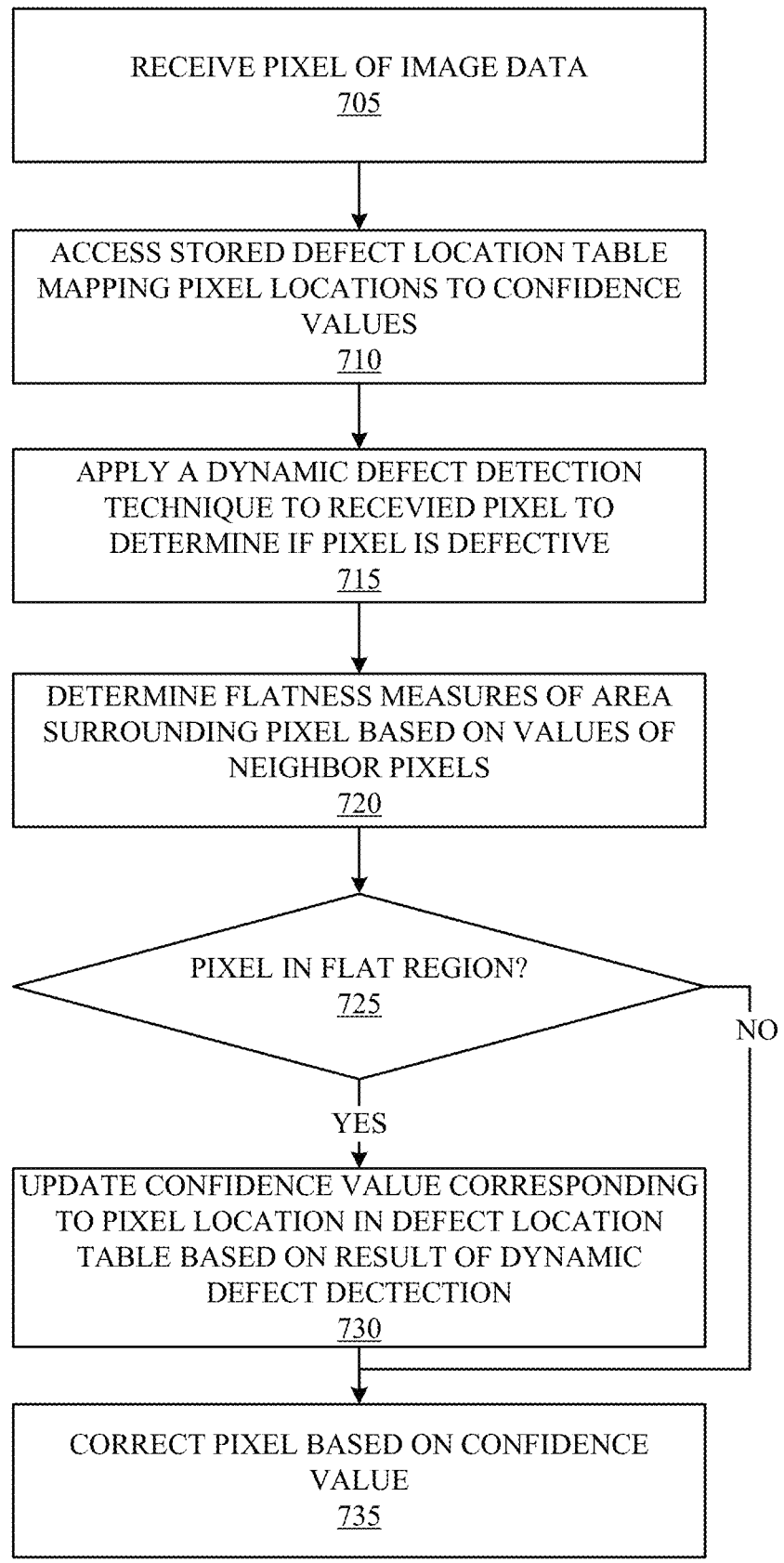
FIG. 7 is a flowchart illustrating a process for performing pixel defect correction, in accordance with some embodiments.

FIG. 7 is a flowchart illustrating a process for performing pixel defect correction, in accordance with some embodiments. The steps of the process 700 illustrated in FIG. 7 may be performed by a pixel defect correction circuit, such as the pixel defect correction circuit 400 illustrated in FIG. 4.

The pixel defect correction circuit receives 705 a pixel of image data. The image data may correspond to an image captured by an image sensor (e.g., the image sensor 202). The image data may correspond to a color image (e.g., with pixels arranged in a Bayer pattern) or a monochrome image.

The pixel defect correction circuit accesses 710 a stored defect location table that maps pixel locations to confidence values. In some embodiments, the defect location table may correspond to the defect pixel location table 490 illustrated in FIG. 4. If the defect location table indicates that the current pixel is defective (e.g., the current pixel is associated with a confidence value above a threshold value), then one or more pixel defect correction techniques may be performed on the current pixel. However, the original value of the pixel may be maintained, to be used for dynamic defect detection (e.g., by the dynamic defect detection processing circuit 420).

The pixel defect correction circuit applies 715 a dynamic defect detection technique to the received pixel, in order to dynamically determine if the pixel is defective. In some embodiments, whether the received pixel is determined to be defective by the dynamic defect detection technique is based upon a value of the pixel relative to the values of a plurality of nearby pixels (e.g., pixels within an array surrounding the current pixel). For example, in some embodiments, if the value of the pixel is higher than a threshold value greater than the value of the highest or second highest of the neighbor pixels, or is lower than a threshold value less than the value of the lowest or second lowest of the neighbor pixels, then the pixel may be determined to be defective.

In some embodiments, the dynamic defect detection technique determines whether the received pixel is a "popping" defect or a highlight. A "popping" defect may refer to a pixel having a value that is higher or lower than its neighbor pixels of the same color channel by at least a threshold amount. On the other hand, the current pixel may be determined to be correspond to a highlight if it and its immediate neighbor pixels of different colors each have values that are higher than their respective neighbor pixels of the same color channel by at least a threshold amount. For example, if a cluster of neighboring pixels are all higher than their respective neighbor pixels by at least a threshold amount, then the cluster of pixels may be considered to be part of a highlight, and not defects. As such, the dynamic defect detection technique may determine that a pixel is "popping" defect and not a highlight if it is not part of a cluster of highlight pixels.

The pixel defect correction circuit uses a flatness detection circuit to determine 720 one or more flatness measures for the current pixel, based upon a set of neighbor pixels of the current pixel. For example, the flatness detection circuit determines a flatness measure corresponding to a comparison between a range of pixel values of a set of neighbor pixels and a threshold value based upon an average pixel value of the neighbor pixels. In some embodiments, additional flatness measures based upon a neighboring pixel of the current pixel, or based upon one or more flags indicating whether the pixel is a speckle pixel, may be determined.

The pixel defect correction circuit determines 725 whether the current pixel is in a flat area of the image, based upon the determined flatness measures. If the pixel defect correction circuit determines that current pixel is in a flat area, then at 730, the pixel defect correction circuit updates a confidence value corresponding to the pixel in the defect location table, based on the result of the dynamic defect detection. For example, if pixel is determined to be defective (e.g., using the dynamic defect detection technique), the confidence value for the pixel may be increased. On the other hand, if the pixel is determined to not be defective, the confidence value for the pixel may be decreased. The pixel defect correction circuit may then correct 735 the value of the pixel based upon the updated confidence value associated with the pixel stored in the defect location table. For example, if the stored confidence value exceeds a threshold, the pixel may be treated as a defective pixel and corrected. Otherwise, the value of the pixel is not corrected. In some embodiments, the value of pixel is corrected if either: (1) the current confidence value associated with pixel stored in the defect location table exceeds the threshold value, or (2) the pixel was previously determined by the dynamic defect detection technique as being defective (e.g., at 715). For example, if a pixel determined to be defective by the dynamic defect detection technique but has a stored confidence value that does not meet the threshold, the pixel may be treated as a defective pixel and corrected. If a pixel is not determined to be defective by the dynamic defect detection technique but has a stored confidence value that exceeds the threshold, then the pixel may still be treated as a defective pixel and corrected. In some embodiments, the pixel is corrected if it is determined to be a "popping" defect and not a highlight, as determined by the dynamic defect detection technique.

If the pixel defect correction circuit determines that the current pixel is not in a flat area, then the pixel defect correction circuit corrects 735 the pixel based upon the un-updated confidence value associated with the pixel stored in the defect location table.

As such, the pixel defect correction circuit may utilize combination of static and dynamic defect pixel detection in order to identify and correct pixel values of received images. The confidence values of the pixels uses for static defect pixel detection are updated based upon the results of dynamic defect pixel detection. However, by only updating the confidence values for pixels within a flat area of the image, more robust and accurate updating can be achieved.

Figure 8:
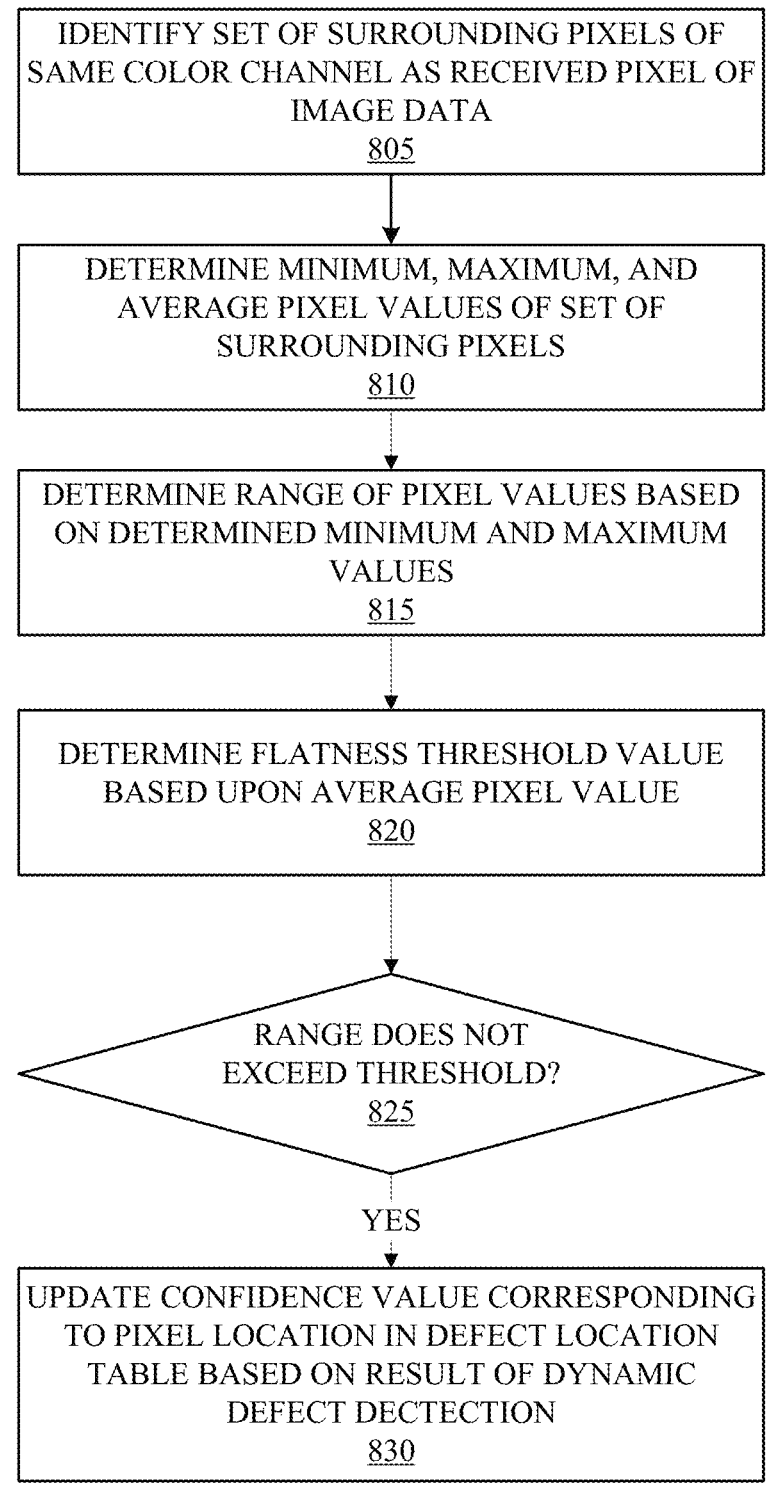
FIG. 8 is a flowchart illustrating a process for updating confidence values for pixels based upon flatness, in accordance with some embodiments.

FIG. 8 is a flowchart illustrating a process for updating confidence values for pixels based upon flatness, in accordance with some embodiments. The steps of the process 800 illustrated in FIG. 8 may be performed by a flatness detection circuit, such as the flatness detection circuit 440 illustrated in FIGS. 4 and 5.

The flatness detection circuit receives a current pixel, and identifies 805 a set of neighbor pixels of the received pixel. The set of neighbor pixels comprises a plurality of pixels that are of the same color as the current pixel (e.g., red, green, or blue). In addition, the set of neighbor pixels may comprise pixels of a different color. In some embodiments, the set of neighbor pixels comprises an n×n array of pixels centered on the current pixel (e.g., a 5×5 array of pixels, as illustrated in FIG. 6B) identified by a region identification circuit.

The flatness detection circuit uses the set of identified neighbor pixels to determine one or more flatness measures associated with the current pixel. For example, the flatness detection circuit determines 810 a maximum, minimum, and average pixel value of the neighbor pixels that are of the same color as the current pixel. In some embodiments, the flatness detection circuit comprises a max calculation circuit, min calculation circuit, and avg calculation circuit that each receives a plurality of pixel values corresponding to the neighbor pixels (e.g., from the region identification circuit) and outputs a maximum value, minimum value, and average value, respectively.

The flatness detection circuit uses a difference calculation circuit to determine 815 a range of pixel values based on the determined maximum and minimum pixel values. For example, the range of pixel values may correspond to a difference between the maximum pixel value and minimum pixel value.

The flatness detection circuit uses a threshold calculation circuit to determine 820 a flatness threshold value based upon the calculated average pixel value. For example, in some embodiments, the flatness threshold value may correspond to a function of the sum of a first flatness threshold value and a second flatness threshold value scaled by the average pixel value, where the first and second flatness threshold values are constants based upon the color of the current pixel. In some embodiments, the flatness threshold value may correspond to a square root of the sum of the first flatness threshold value and second flatness threshold value scaled by the average pixel value.

The flatness detection circuit uses a comparator circuit to compare 825 the determined range of pixel values to the flatness threshold value. If the range of pixel values does not exceed the flatness threshold, then the current pixel may be considered to be in a flat region of the image.

In some embodiments, the flatness detection circuit further determines one or more additional flatness measures. For example, the additional flatness measures may include a second flatness measure corresponding to a neighbor pixel of the current pixel of a second, different color. In some embodiments, the second flatness measure is calculated similarly, based upon a comparison of a range of pixel values of the second color and a flatness threshold value based upon the average pixel values of the second color. In addition, the flatness detection circuit may determine a third flatness measure based upon whether the pixel value of the current pixel meets one or more threshold values, or is a speckle pixel. The final determination of whether the current pixel is in a flat region may be based upon an aggregation of the different calculated flatness measures. In some embodiments, the flatness determination may be based upon a combination of the flatness measures for the current pixel and the flatness measures of a neighbor pixel.

If the current pixel was determined to be in a flat region (e.g., the range of pixel values did not exceed the flatness threshold), then the pixel defect correction circuit updates 830 a confidence value associated with the pixel (e.g., the confidence value corresponding to the pixel stored in a defect location table, based upon the result of an applied dynamic defect detection technique applied on the pixel. For example, if the pixel was determined to be defective using the dynamic defect detection technique, the confidence value indicating that the pixel is defective is increased. On the other hand, if the pixel was determined to not be defective, the confidence value is decreased. In some embodiments, the confidence value is increased or decreased a set amount. In other embodiments, the confidence value is increased or decreased based upon a level of confidence of the dynamic defect detection technique in determining whether the pixel is defective or not.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A pixel defect detection circuit, comprising:
 a flatness detection circuit configured to:
  receive an image frame captured by an image sensor comprising raw image data;
  analyze pixel values of the raw image data of the received image frame to determine whether a first pixel of the received image frame is in a flat region of the image frame; and
 a confidence adjustment circuit configured to:
  responsive to determining that the first pixel is in a flat region of the image frame:
   receive an indication indicating whether the first pixel has been determined to be defective; and
   update a confidence value for a location corresponding to the first pixel in a defect pixel location table based on whether the first pixel was determined to be defective, the defect pixel location table indicating respective confidence values corresponding to each of a plurality of pixel locations of the image frame, each confidence value indicating a likelihood that a pixel at a corresponding pixel location of the raw image data of images captured by the image sensor is defective; and
  responsive to determining that the first pixel is not in a flat region, retain the confidence value for the location corresponding to the first pixel in the defect pixel location table, regardless of whether the first pixel is determined to be defective or not.

2. The pixel defect detection circuit of claim 1, wherein the flatness detection circuit is configured to:
 identify a set of nearby pixels near the first pixel in the image frame;
 determine a pixel value range of the set of nearby pixels;

compare the determined pixel value range with a flatness threshold value, wherein the first pixel is determined to be in a flat region of the image frame if the pixel value range does not exceed the flatness threshold value.

3. The pixel defect detection circuit of claim 2, wherein the flatness threshold value is determined based upon an average pixel value of the set of nearby pixels.

4. The pixel defect detection circuit of claim 2, wherein the set of nearby pixels is selected based upon a color channel associated with the first pixel.

5. The pixel defect detection circuit of claim 2, wherein the set of nearby pixels corresponds to a set of pixels immediately surrounding the first pixel in the image frame.

6. The pixel defect detection circuit of claim 1, wherein the flatness detection circuit is further configured to:
identify a first set of nearby pixels near the first pixel in the image frame, based upon a first color channel associated with the first pixel;
identify a second set of nearby pixels near a second pixel in the image frame adjacent to the first pixel, based upon a second color channel associated with the second pixel that is different from the first color channel;
determine a first flatness measure based on the first set of nearby pixels determine a second flatness measure based on the second set of nearby pixels;
determine whether the first pixel is in a flat region of the image frame based upon the first flatness measure and the second flatness measure.

7. The pixel defect detection circuit of claim 6, wherein:
the first flatness measure is based upon a comparison of a first range of values of the first set of nearby pixels to a first threshold value, the first threshold value determined based upon the first color channel and an average value of the first set of nearby pixels; and
the second flatness measure is based upon a comparison of a second range of values of the second set of nearby pixels to a second threshold value, the second threshold value determined based upon the second color channel and an average value of the second set of nearby pixels.

8. The pixel defect detection circuit of claim 7, wherein the flatness detection circuit is further configured to:
determine a third flatness measure based upon a value of the second pixel relative to the second set of nearby pixels; and
determine whether the first pixel is in a flat region of the image frame based upon the first flatness measure, the second flatness measure, and the third flatness measure.

9. The pixel defect detection circuit of claim 1, further comprising:
a dynamic defect processing circuit configured to determine whether the first pixel is defective.

10. The pixel defect detection circuit of claim 9, wherein the dynamic defect processing circuit is further configured to, in response to the confidence value for the location in the defect pixel location table corresponding to the first pixel exceeding a threshold value, apply a defective pixel correction technique to the first pixel to update the value of the first pixel.

11. A computer-implemented method, comprising:
receiving an image frame captured by an image sensor comprising raw image data;
analyzing pixel values of the raw image data of the received image frame to determine whether a first pixel of the received image frame is in a flat region of the image frame; and
receiving an indication indicating whether the first pixel has been determined to be defective;
responsive to determining that the first pixel is in a flat region of the image frame:
updating a confidence value for a location corresponding to the first pixel in a defect pixel location table based on whether the first pixel was determined to be defective, the defect pixel location table indicating respective confidence values corresponding to each of a plurality of pixel locations of the image frame, each confidence value indicating a likelihood that a pixel at a corresponding pixel location of the raw image data of images captured by the image sensor is defective.

12. The method of claim 11, further comprising:
receiving second pixel data corresponding to a second pixel of the image frame;
determining whether the second pixel of the received image frame is in a flat region of the image frame; and
receiving an indication indicating whether the second pixel has been determined to be defective;
responsive to determining that the second pixel is not in a flat region, retain a confidence value for a second location of the defect pixel location table corresponding to the second pixel, regardless of whether the second pixel is determined to be defective or not.

13. The method of claim 11, wherein determining whether the first pixel is in a flat region of the image frame comprises:
identifying a set of nearby pixels near the first pixel in the image frame;
determining a pixel value range of the set of nearby pixels;
comparing the determined pixel value range with a flatness threshold value, wherein the first pixel is determined to be in a flat region of the image frame if the pixel value range does not exceed the flatness threshold value.

14. The method of claim 13, wherein the flatness threshold value is determined based upon an average pixel value of the set of nearby pixels.

15. The method of claim 11, wherein determining whether the first pixel is in a flat region of the image frame comprises:
identifying a first set of nearby pixels near the first pixel in the image frame, based upon a first color channel associated with the first pixel;
identifying a second set of nearby pixels near a second pixel in the image frame adjacent to the first pixel, based upon a second color channel associated with the second pixel that is different from the first color channel;
determining a first flatness measure based on the first set of nearby pixels
determining a second flatness measure based on the second set of nearby pixels;
determining whether the first pixel is in a flat region of the image frame based upon the first flatness measure and the second flatness measure.

16. The method of claim 15, wherein:
determining the first flatness measure comprises comparing a first range of values of the first set of nearby pixels to a first threshold value, the first threshold value determined based upon the first color channel and an average value of the first set of nearby pixels; and
determining the second flatness measure comprises comparing a second range of values of the second set of nearby pixels to a second threshold value, the second threshold value determined based upon the second color channel and an average value of the second set of nearby pixels.

17. The method of claim 16, wherein determining whether the first pixel is in a flat region of the image frame further comprises:
   determining a third flatness measure based upon a value of the second pixel relative to the second set of nearby pixels; and
   determining whether the first pixel is in a flat region of the image frame based upon the first flatness measure, the second flatness measure, and the third flatness measure.

18. The method of claim 11, further comprising:
   determining whether the first pixel is defective.

19. The method of claim 18, further comprising, in response to the confidence value for the location in the defect pixel location table corresponding to the first pixel exceeding a threshold value, applying a defective pixel correction technique to the first pixel to update the value of the first pixel.

20. An image signal processor comprising:
   a memory storing a defect pixel location table, the defect pixel location table mapping pixel locations to respective confidence values, each confidence value indicating a likelihood that a corresponding pixel is defective;
   a pixel defect correction circuit, the pixel defect correction circuit configured to receive a stream of pixel data corresponding to pixels of an image frame, and comprising:
      a flatness detection circuit configured to:
         receive an image frame captured by an image sensor comprising raw image data; and
         analyze pixel values of the raw image data of the received image frame to determine whether a first pixel of the received image frame is in a flat region of the image frame; and
      a confidence adjustment circuit configured to:
         responsive to determining that the first pixel is in a flat region of the image frame:
            receive an indication indicating whether the first pixel has been determined to be defective;
            update a confidence value for a location corresponding to the first pixel in a defect pixel location table based on whether the first pixel was determined to be defective, the defect pixel location table indicating respective confidence values corresponding to each of a plurality of pixel locations of the image frame, each confidence value indicating a likelihood that a pixel at a corresponding pixel location of the raw image data of images captured by the image sensor is defective; and
         responsive to determining that the first pixel is not in a flat region, retain the confidence value for the location corresponding to the first pixel in the defect pixel location table, regardless of whether the first pixel is determined to be defective or not.

* * * * *